(12) United States Patent
Cronch

(10) Patent No.: US 7,386,754 B2
(45) Date of Patent: Jun. 10, 2008

(54) METHOD AND APPARATUS TO IMPROVE MAGNETIC DISC DRIVE RELIABILITY USING EXCESS UN-UTILIZED CAPACITY

(75) Inventor: Robert Cronch, Emond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1015 days.

(21) Appl. No.: 10/687,326

(22) Filed: Oct. 16, 2003

(65) Prior Publication Data
US 2005/0086567 A1   Apr. 21, 2005

(51) Int. Cl.
G06F 11/00 (2006.01)
(52) U.S. Cl. ........................................................ 714/5
(58) Field of Classification Search .................... 714/5
See application file for complete search history.

(56) References Cited

U.S. PATENT DOCUMENTS

| | | | |
|---|---|---|---|
| 5,313,464 A | | 5/1994 | Reiff |
| 5,375,128 A | * | 12/1994 | Menon et al. ............... 714/770 |
| 5,519,849 A | * | 5/1996 | Malan et al. ................ 711/114 |
| 5,640,506 A | * | 6/1997 | Duffy ............................ 714/6 |
| 5,666,512 A | * | 9/1997 | Nelson et al. ............... 711/114 |
| 5,732,088 A | | 3/1998 | Sako |
| 5,757,752 A | | 5/1998 | Sako |
| 5,758,054 A | * | 5/1998 | Katz et al. ..................... 714/22 |
| 5,790,773 A | * | 8/1998 | DeKoning et al. .............. 714/6 |
| 5,960,169 A | * | 9/1999 | Styczinski ...................... 714/6 |
| 5,966,359 A | | 10/1999 | Sako |
| 6,035,433 A | | 3/2000 | Sako |
| 6,058,455 A | * | 5/2000 | Islam et al. .................. 711/114 |
| 6,108,152 A | | 8/2000 | Du |
| 6,125,469 A | | 9/2000 | Zook |
| 6,205,569 B1 | | 3/2001 | Forehand |
| 6,216,245 B1 | | 4/2001 | Noda |
| 6,243,338 B1 | | 6/2001 | Mine |
| 6,252,731 B1 | | 6/2001 | Sloan |
| 6,275,965 B1 | | 8/2001 | Cox |
| 6,282,671 B1 | * | 8/2001 | Islam et al. ..................... 714/6 |
| 6,332,206 B1 | | 12/2001 | Nakatsuji |
| 6,343,367 B1 | | 1/2002 | Shen |
| 6,405,342 B1 | | 6/2002 | Lee |
| 6,412,089 B1 | | 6/2002 | Lenny |
| 6,493,656 B1 | | 12/2002 | Houston |
| 6,553,533 B2 | | 4/2003 | Demura |

(Continued)

OTHER PUBLICATIONS

Chen, P. M., Lee, E. K., Gibson, G. A., Katz, R. H., and Patterson, D. A. RAID: high-performance, reliable secondary storage. ACM Comput. Surv. 26, 2 (Jun. 1994), 145-185.*

Primary Examiner—Scott Baderman
Assistant Examiner—Paul F Contino
(74) Attorney, Agent, or Firm—Kirk Cesari; Westman, Champlin & Kelly

(57) ABSTRACT

A method of storing data on a storage device is disclosed. The method includes receiving data at a storage device containing the storage media, adding error correction code to the received data, generating additional error correction information based upon an amount of free space on the storage media, storing the data on the storage media, and storing the generated additional error correction information on the storage media. The method further includes selecting one of a plurality of methods for generating error correction information based upon the amount of free space on the storage media, and generating the error correction information based on the selected method.

25 Claims, 10 Drawing Sheets

U.S. PATENT DOCUMENTS 6,880,060 B2 * 4/2005 Talagala et al. ............ 711/170
6,985,995 B2 * 1/2006 Holland et al. ............. 711/114
7,133,228 B2 * 11/2006 Fung et al. ................... 360/39

* cited by examiner

METHOD AND APPARATUS TO IMPROVE MAGNETIC DISC DRIVE RELIABILITY USING EXCESS UN-UTILIZED CAPACITY

FIELD OF THE INVENTION

The present invention relates generally to data storage systems, and more particularly but not by limitation to adding additional error correction and recovery ability to data stored on a disc drive.

BACKGROUND OF THE INVENTION

Data storage systems such as disc drives typically store information on the surface of a storage media such as a magnetic or optical disc. In a typical disc drive a number of discs are stacked in a disc stack and mounted together on a single spindle that rotates. Each side of the disc in the disc stack has a surface which is used to store information. Above the surface of the disc is usually at least one head that reads information from and/or writes information to the surface of the disc. These heads are typically mounted on an actuator arm that moves the heads in tandem over the surface of the discs so that all of the heads at the same approximate disc radius at the same time.

When information is stored on a disc it is generally stored in a set of concentric circular patterns called tracks. The tracks on the disc surface are typically divided into sectors. Sectors are the basic unit of data storage on a disc surface. A sector is a "pie-shaped" angular section of a track that is bounded on two sides by radii of the disc and on the other side by the perimeter of the circle that defines the track. In other words, the sector is a small segment along the length of a track. In previous generation hard discs, each disc has the same number of sectors per track, and the number of sectors per track was generally the same regardless of the disc's manufacturer. However, advances in disc drive design have allowed the number of sectors per track to vary significantly within the disc and across manufacturers.

In order to read and write data from the correct location in the disc stack, the data storage areas of the disc stack are identified by a cylinder address, head address and sector address. A cylinder identifies a set of specific tracks on the disc surfaces in the disc stack which lie at equal radii and are, in general, simultaneously accessible by the collection of heads. The head address identifies which head can read the data and therefore identifies the disc in the stack that the data is located. Each track within a cylinder is further divided into sectors for storing data and servo information. The sector is identified by an associated sector address.

Most cylinders are available for read/write access by the host computer. However, drive unique information, for example, the drive defect table (a table that contains remap information to circumvent defective sectors formed at the time the disc was manufactured) is stored in reserved cylinders which are not normally accessible by the host computer. Typically, multiple copies of drive unique information are stored in reserved cylinders. Additionally, multiple copies of user data are sometimes stored on user accessible cylinders for faster access and data backup purposes.

Each of the multiple copies of data is stored on a different set of sectors. Defects can arise in any of these sectors at various times during the lifetime of the storage system (grown defects). Grown defects include, for example, invading foreign particles which become embedded onto the surface of the disc, or external shocks to the storage system which can cause the transducer to nick or crash onto the surface of the disc. Defective sectors present within a group of sectors storing any of the multiple copies of information pose either temporary or permanent problems in retrieving an entire copy.

In typical prior art systems, when retrieval of a first copy fails due to a defective sector being encountered, a second attempt is made to retrieve a second copy. If the second attempt fails, a third attempt is made to retrieve a third copy and so forth. This process is repeated until, either a complete copy of the data is retrieved or until a recovery attempt on the last available copy has failed. In this retrieval method, any portion of information contained on a defective sector in each copy is sufficient to prevent the retrieval of a complete copy of information. Therefore, at least one copy of information should be contained on a set of completely error-free sectors for the prior art retrieval method to work. Consequently, data can be lost, or in some cases, where critical information like the defect table cannot be retrieved, the drive could prevent the user from accessing any data stored on the disc.

However, as the user fills up the space on the disc with data there is less space available on the disc to store complete copies of the data. Therefore, in order to preserve as much space on the disc, error correction codes (ECC) are added to the data stored on the disc to assist in the recreation of corrupted data. The use of ECC on data then replaces the need for copying or mirroring of data to other sectors of the drive.

There are several types of error correction codes that have been developed for recovering lost data. Error correction methods are typically chosen depending on the error characteristics of the transmission or storage medium, such that these errors are detected and corrected with a minimum of redundant data stored or sent. Typically, in data storage systems, block ECC codes are used, such as Hamming codes or Reed-Solomon codes. These codes transform a chunk of bits into a longer chunk of bits in such a way that errors up to a threshold in each block of data can be detected and corrected. Hamming codes are typically used to correct errors that occur in the main memory such as DRAM, whereas Reed-Solomon code is typically used to correct errors in peripheral devices such as disc drives. However, either correction type can be used on either type of device.

Hamming codes allow for detection of multiple errors in the bits that comprise a word. A word is merely a set number of bits that represent data. Generally in prior art systems a word is an 8, 16 or 32 bit string. Hamming code is able to correct errors of one bit, but cannot correct errors of more than one bit in the word. The ability to correct a single bit in words of this length has provided sufficient reliability for the data. However, as word length has increased with the use of 64 and 128 bit words, there is an increase in the probability of errors occurring in the words, and therefore can increase the need for more error correction that cannot be provided by Hamming ECC.

Reed-Solomon coding has historically been used in areas where there is a high probability of errors occurring where multiple bits or even bytes of data are lost. Reed-Solomon code provides the ability to correct multiple errors as the error correction is applied to entire blocks of data.

Storage of Reed-Solomon ECC generally does not present a problem in peripheral storage systems because a small amount of data is written to the sector in addition to the actual data. In current generation disc drives a typical sector size is 512 bytes. Reed Solomon error correction code encodes blocks of n-bit symbols in the sector. The total number of n-bit symbols in the encoded block is 2n−1. Thus a block encoding 8 bit bytes has 255 bytes. The number of data symbols in the block can vary. A typical block encodes 233 bytes in the 255-byte block. This leaves 22 bytes in the block for error correction. The scheme encodes the block's message as points in a polynomial plotted over a finite field (usually a small binary number). The coefficients of the polynomial are the data of the block. The plot over determines the coefficients, which can be recovered from quite small subsets of the plotted points. In the same sense that one can correct a curve by interpolating past a gap, a Reed-Solomon code can bridge a series of errors in a block of data to recover the coefficients of the polynomial that drew the original curve.

As sector sizes increase and disc drives become more sensitive due to advances in storage technology, it is becoming more important to reconstruct corrupted data. As users typically don't use the entire capacity of the disc for storage there is a vast amount of unused space on the drive that can be used for data redundancy and error correction. Therefore, it is desirable to have a disc drive or other storage media that increases data redundancy without detracting from the overall capacity of the storage media.

Embodiments of the present invention provide solutions to these and other problems, and offer other advantages over the prior art.

SUMMARY OF THE INVENTION

One embodiment of the present invention is directed to a data storage system. The data storage system comprises a storage media and a controller. The storage media is configured to store data. The controller is configured to determine an amount of free space available on the storage media. The controller then selects a method of generating additional error correction information for the data stored on the storage media based upon the amount of free space on the storage media. The controller is further configured to generate the additional error correction information for data stored on the storage media based on the selected method. The controller selects one of a plurality of methods for generating error correction information based upon whether the remaining capacity of the storage media meets one of a plurality of threshold values. In an alternative embodiment the controller is divided into a first control component and a second control component. The first control component determines the free space on the storage media and selects the method for generating the error correction information. The second control component generates the error correction information selected by the first control component. The methods of generating additional error correction information can include mirroring the data, compressing the data, adding additional error correction code, or compressing the mirrored data.

A second embodiment of the present invention is directed to a method of storing data on a storage device. The method includes receiving data at a storage device containing the storage media, adding error correction code to the received data, generating additional error correction information based upon an amount of free space on the storage media, storing the data on the storage media, and storing the generated additional error correction information on the storage media. The method further includes selecting one of a plurality of methods for generating error correction information based upon the amount of free space on the storage media, and generating the error correction information based on the selected method.

In determining which method to select for generating error correction information, the method of the present invention calculates the amount of free space available on the storage media. The method then compares the calculated amount of free space against a plurality of threshold values, each of the plurality of thresholds corresponds to an amount of free space on the storage media and a method of generating additional error correction information. The method then identifies the threshold value that corresponds with the calculated amount of free space, and then the method executes the method of generating error correction information for the identified threshold value. The methods can select from several methods of generating error correction information including mirroring the data, compressing the data, adding additional error correction code, or compressing the mirrored data.

Other features and benefits that characterize embodiments of the present invention will be apparent upon reading the following detailed description and review of the associated drawings.

BRIEF DESCRIPTION OF THE DRAWINGS

FIG. 7-1 is a detailed view of a sector.

FIG. 7-2 is a graph plotting error correction code redundancy rate versus bit error rate.

FIG. 7-3 is a detailed view of a sector however a portion of the compressed.

DETAILED DESCRIPTION OF ILLUSTRATIVE EMBODIMENTS

Figure 1:
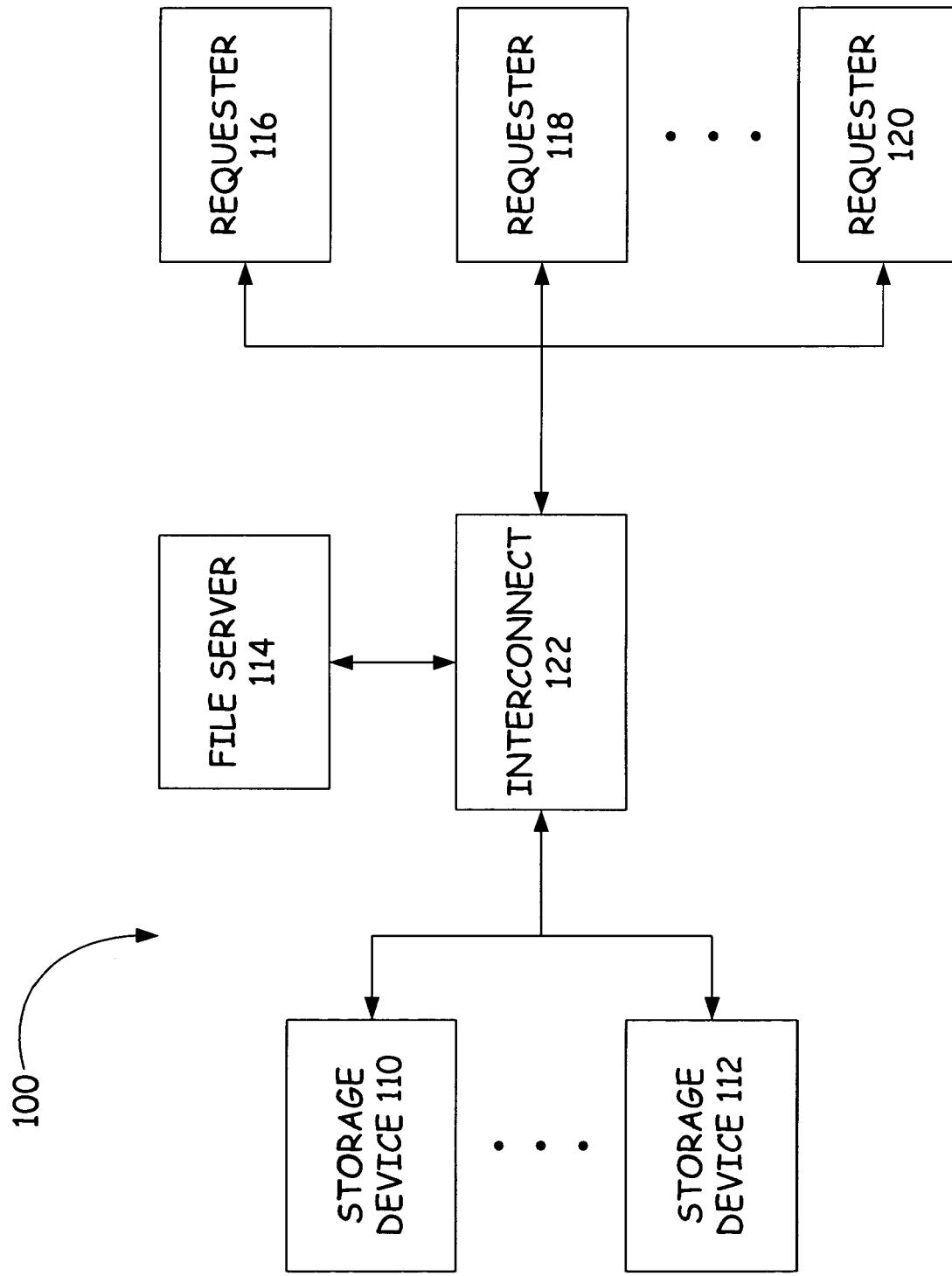
FIG. 1 is a block diagram of a data storage system.

FIG. 1 is a block diagram of a data storage system 100 in accordance with one aspect of the present invention. System 100 includes a data storage device 110, file server 114, requesters 116, 118 and 120, and interconnect 122.

Storage device 110 is a storage component which perform the data storage function of System 100. Storage device 110 preferably include disc drives, redundant arrays of independent discs (RAID) subsystems, tape drives, tape libraries, optical drives, juke boxes or any other storage device which can be used to store data. Storage device 110 is also provided with an input/output (I/O) channel attachment to requesters 116, 118 and 120, which access device 110.

Requesters 116, 118 and 120 are components, such as servers, clients or programs, which access or share information stored on device 110. Requesters 116-120 are also preferably configured to directly access the information on storage device 110.

File server 114 performs management and security functions, such as request authentication and resource location.

In smaller systems, a dedicated file server is preferably not used. Instead, one of requesters 116-120 assumes the function and responsibility of overseeing the operation of system 100 carried out by file server 114. In addition, where security and functionality provided by file server 114 is not needed or desired, or where an overriding need for performance requires that the cluster of requesters 116-120 talk directly with storage device 110, file server 114 is eliminated from system 100.

Interconnect 122, in one preferred embodiment, is the physical infrastructure over which all components in data storage system 100 communicate with one another.

Depending on the security practice of a particular system 100, requesters 116-120, or any of them, may be denied access to some components of system 100. From the set of storage device 110 available to each requester, that requester can then identify the files, data bases, and free space available to it.

Figure 2:
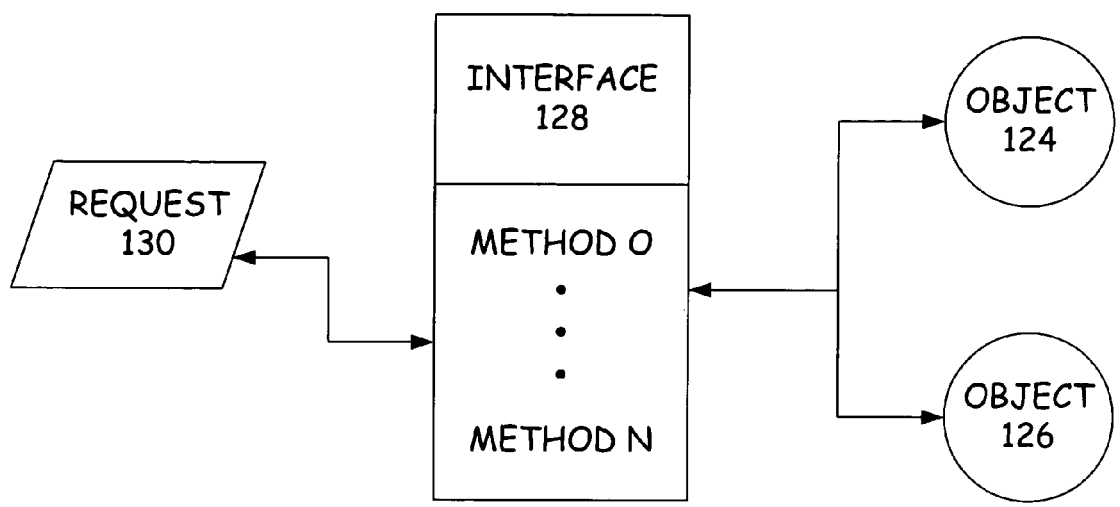
FIG. 2 illustrates an object model in accordance with our embodiment of the present invention.

In accordance with one aspect of the present invention, the information stored on storage device 110 is stored with a system better illustrated in FIG. 2. Storage device 110 is in one embodiment an object oriented device which operates in a mode in which data is organized and accessed as objects 124-126 rather than as an ordered sequence of sectors. The device 110 manages objects 124-126 with an object file system which illustratively includes a single level list of the objects for each partition on the particular device. This is also referred to as a flat file system. The objects 124-126 which are stored on the storage medium in each device 110 are preferably the smallest visible units of capacity allocation on a device 110 which is operating in object oriented device mode. An object on such a storage device includes an ordered set of sectors associated with a unique identifier. Data is referenced by the identifier and an offset into the object. The object is allocated and placed on the storage media by the storage device 110, itself, while the operating system manages its files and metadata in these object constructs, instead of managing sectors of data, as is common in prior architectures. However, the present invention can be used on a sector model as well.

Objects 124-126 are accessed by an interface 128 in which the objects expose a plurality of methods which can be invoked by a requester 116 in order to access and manipulate attributes and data in objects 124-126. Thus, as shown in FIG. 2, a request 130 is issued from a requester 116. In one embodiment, requester 116 is a computer system, which submits request 130 for action on the storage device which contains objects 124-126. Request 130 which is issued by one of requester 116 invokes one of the methods in interface 128, which, in turn, causes the manipulation of one or more of objects 124-126.

Figure 3:
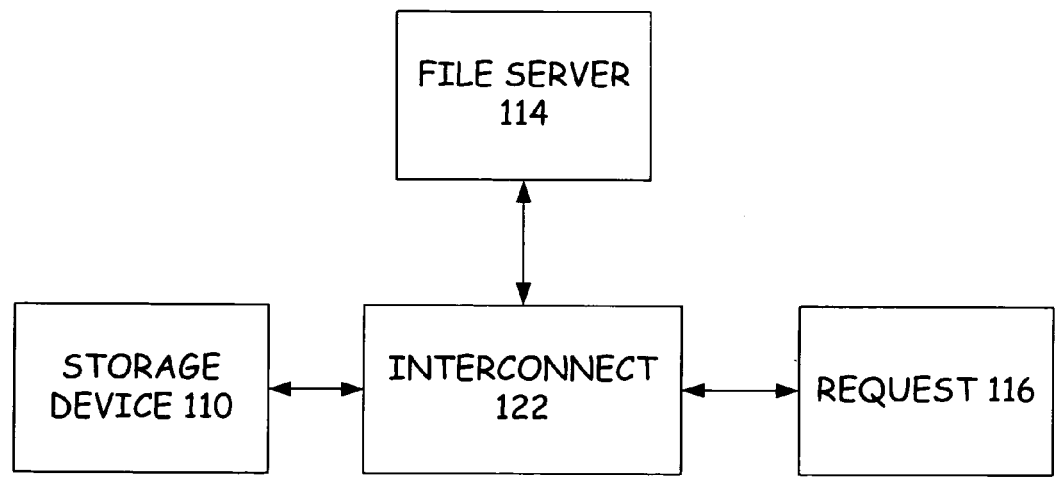
FIG. 3 is a block diagram of one configuration of the present invention.

FIG. 3 is a block diagram of one configuration that can be used to access objects stored on storage device 110. When requester 116 wishes to open an object (such as object 124-126) requester 116 may be able to directly access storage device 110, or it may be required to request permission from a file server 114 and the location information, in order to access an object on storage device 110. The extent to which file server 114 controls access to storage device 110 is primarily a function of the security requirements of the particular implementation of system 100.

In the block diagram illustrated in FIG. 3, system 100 is assumed to be secure. That is, there is no requirement to protect the transmission of command information and data between requester 116 and storage device 110. In such an implementation, there still may be a file server 114 present for management functions, but file server 114 is not needed to oversee requester interaction with storage device 110.

In such an implementation, requester 116 is in a position to access and create objects directly on storage device 110. Requester 116 can thus open, read, write and close objects as if they were natively attached to requester 116. A brief overview of this process is provided at this point, for the sake of clarity. In order to read an object on storage device 110, requester 116 may preferably first read from one or more objects which reveal the logical volumes or partitions on storage device 110, and how to begin searching for an object stored thereon. Requester 116 then opens and reads an object, which may be a root directory. From this object, locating other objects is straight forward, and is based on the contents of the root directory. Requester 116 repeats the process until the desired data is located. Data is referenced by an object identification (object ID) and a displacement within the object.

Figure 4:
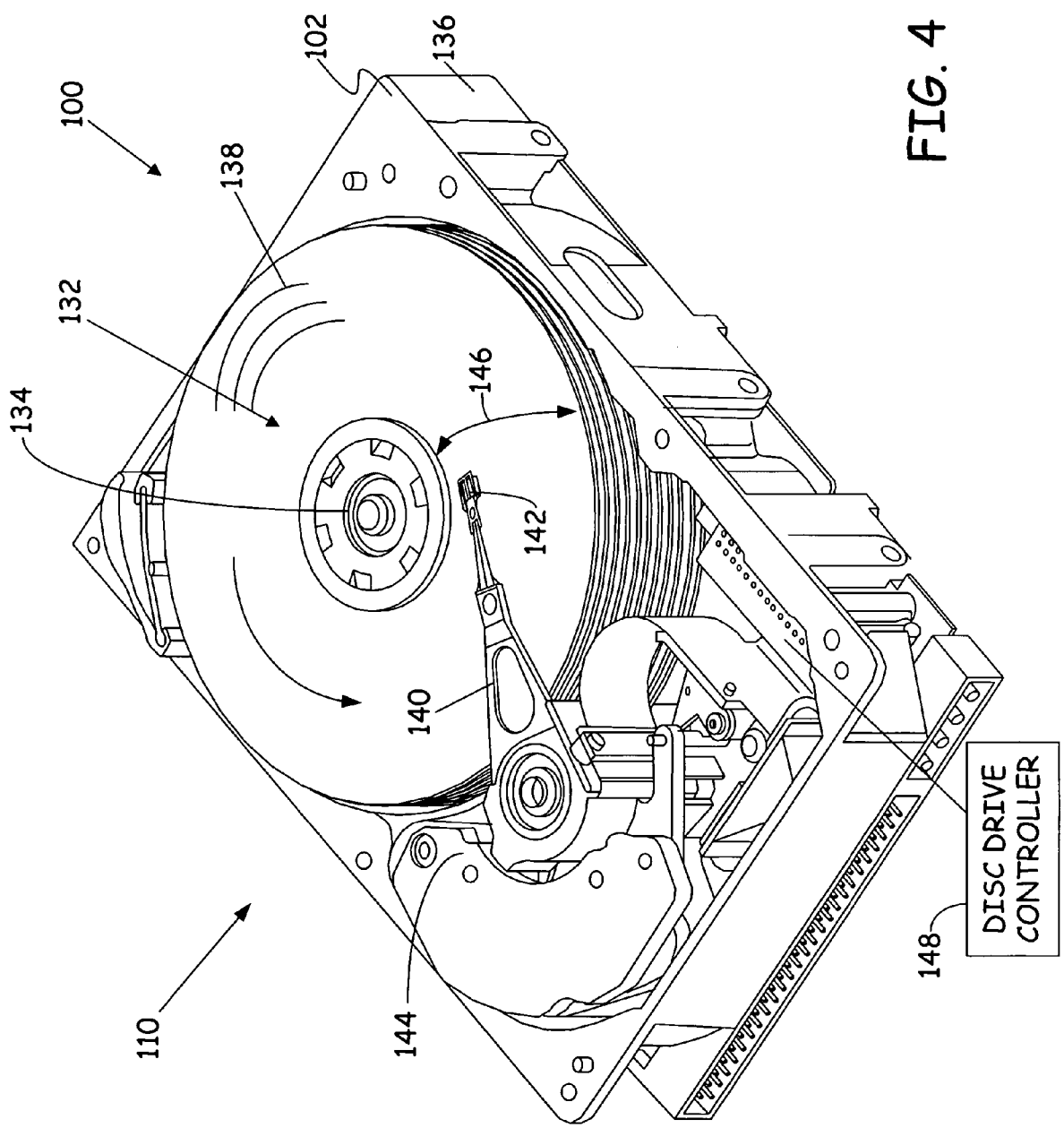
FIG. 4 is a perspective view of a disc drive.

FIG. 4 is a perspective view of a hard disc drive, which can be implemented as storage device 110. In disc drive 110, a plurality of discs 132 are arranged about a spindle motor assembly 134 within a housing 136. Each disc 132 has a multiplicity of concentric circular recording tracks, indicated schematically at 138. Each track 138 is subdivided into a plurality of partitions or sectors (described in greater detail with respect to FIG. 6). Data can be stored on, or retrieved from, discs 132 by referring to a specific partition within a track 138. An actuator arm assembly 140 is rotatably mounted preferably in one corner of housing 136. The actuator arm assembly 140 carries a plurality of head gimbal assemblies 142, which each carry a slider having a read/write head, or transducer (not shown) for reading information from and writing information onto discs 132.

A voice coil motor 144 is adapted to precisely rotate the actuator arm assembly 140 back and forth such that the transducers on sliders 142 move across the surface of discs 132 along an arch generally indicated by arrow 146. FIG. 4 also illustrates, in block diagram form, a disc drive controller 148, which is used in controlling certain operations of disc drive 110 in a known manner. However, in accordance with the present invention, disc drive controller 148 is also used in implementing interface 128 to objects 124-126 stored on discs 132.

Figure 5:
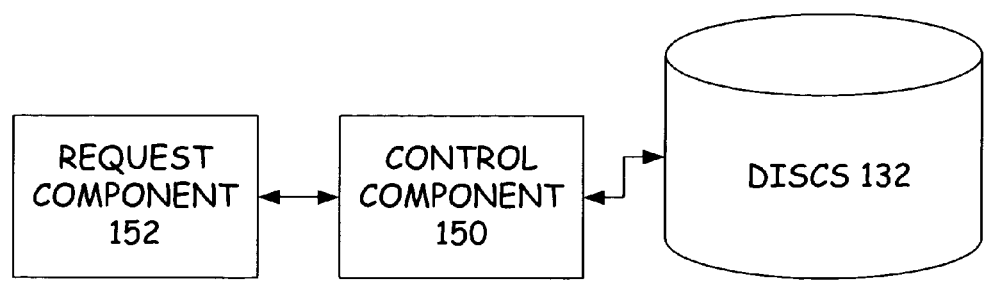
FIG. 5 is a block diagram of a portion of a disc drive.

FIG. 5 is a block diagram of a portion of disc drive 110 as it fits within system 100 shown in FIG. 1. In FIG. 5, disc drive controller 148 includes a control component 150 which implements interface 128. Objects 124-126 are stored on the storage medium which constitutes disc 132. Request component 152 is implemented on requester 116, and is formed to logically formulate requests which invoke methods in interface 128. Control component 150, upon the invocation of a method, carries out certain tasks in order to manipulate identified objects in a desired way. Control component 150 returns an event, which can include data or attributes associated with any identified object. The event is also returned based upon the particular method invoked by the requester 116.

In order for an object oriented device 110 to provide the same functionality delivered by an operating system with block oriented devices, storage space on device 110 must be manageable to a similar degree. Thus, in one preferred embodiment, an organizational layer on storage devices 110 is provided above objects 124-126 which are stored thereon. In one preferred embodiment, storage device 110 provide for allocating disc space into one or more mutually exclusive regions, referred to as partitions. Partitions are further divided into sectors that are described in greater detail with respect to FIG. 6. Within a partition, a requester 116 can create objects. In one preferred embodiment, the structure within a partition is a simple, flat organization. Onto this organization, any operating system can map its own structures.

Figure 6:
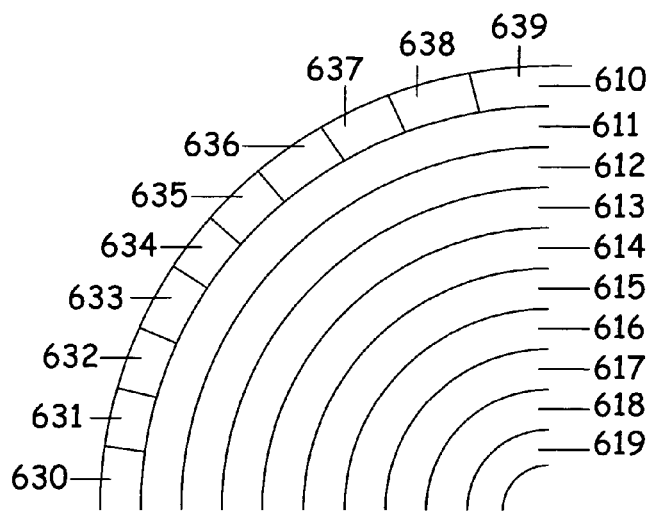
FIG. 6 is a plan view of one disc in the disc drive.

FIG. 6 is a plan view of a disc 600 similar to one of the discs 132 in disc drive 110. In one embodiment, disc 600 is a flat round disc that is coated on both sides with a magnetic material designed to store information in the form of magnetic parameters. However, those skilled in the art will recognize that other materials can be used to store information on the disc 132, such as in an optical disc. Further, disc 600 is divided into a plurality of tracks 610-619. These tracks are further divided into a plurality of sectors 630-639. For purposes of clarity only a limited number of the tracks and sectors present on the disc 600 are illustrated. However, those skilled in the art will recognize that many more tracks and sectors are present on disc 600.

In one embodiment tracks 610-619 are divided into sectors having a sector size of 512 bytes. However, other sector sizes can be used, such as 256 bytes, 1024 bytes or 4096 bytes. While sector size is typically referred to according to the amount of user data that the sector can hold or store, each sector actually stores more than the listed number of bytes of information. Additional bytes in the sector are used for control structures and other information necessary to manage the drive, locate data on the drive, and the perform other operations in support of the drive operation. The structure of the sector as well as the additional information stored in the sector can vary depending on the make and manufacturer of the drive. Regardless of the manufacturer, sectors 630-639 usually include ID information, synchronization fields, error correction code (ECC), the user data, and gaps.

ID information is space in the sector that identifies the sector's number and location to the drive controller 148. This is used for locating the sector on the disc. The ID information can also include status information about the sector, such as a bit used to indicate if the sector has been marked defective and remapped by the drive.

Synchronization fields are used internally by the controller to guide the read process of the head. The data is the user data stored in the sector. Gaps are one or more spacers added to separate other areas of the sector, or provide time for the controller to process what has been read before reading more bits from the sector. The ECC is provided to ensure data integrity and to provide a partial ability to recover data in the event of data loss or corruption. ECC will be discussed in further detail below. This extra information added to the sector reduces the overall capacity of the drive that can be used for storage of user data.

In some disc drives the ID fields are removed from the sector format. Instead of labeling each sector within the sector header itself, a format map is stored in the drive's internal memory and referenced when a sector must be located. This map also contains information about what sectors have been marked bad and relocated, where the sectors are relative to the location of servo information. By removing the ID information from the sector format efficiency is improved, allowing more data to be stored on the surface of each disc, while also improving drive performance.

Despite the precision manufacturing processes used to create hard discs, it is virtually impossible to create a disc with a plurality of sectors and not have some errors occur. Imperfections in the media coating on the disc or other problems can make a sector inoperable or can corrupt the data on the sector. A problem with a sector, if uncorrected, normally manifests as an error when the drive attempts to read from or write to the sector, but can appear in other ways as well.

Error correction code (ECC) helps to identify when errors occur and can correct many errors. However, there are some flaws that ECC alone cannot overcome, and that therefore prevent parts of a disc from being used. Usually these are individual sectors that don't work, which are then labeled bad sectors. However, these bad sectors can occur in clusters or groups, which make redundant data storage helpful if the data is to be recovered. However, redundant data uses valuable space on the drive, which may not be necessary for the specific data stored on the sector.

Figures 1, 7:
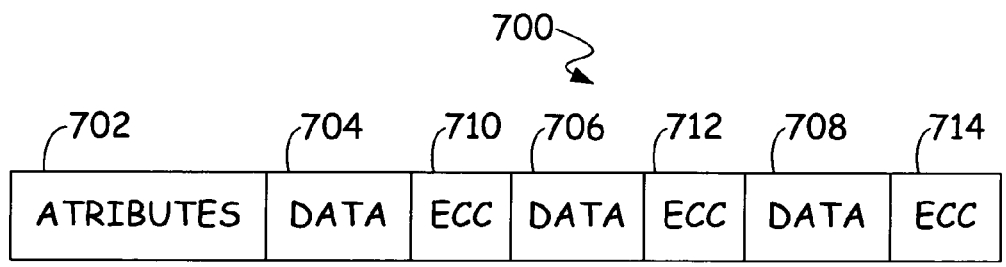
Figures 3, 7:
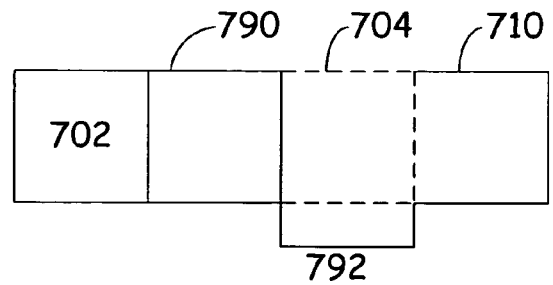
Figures 2, 7:
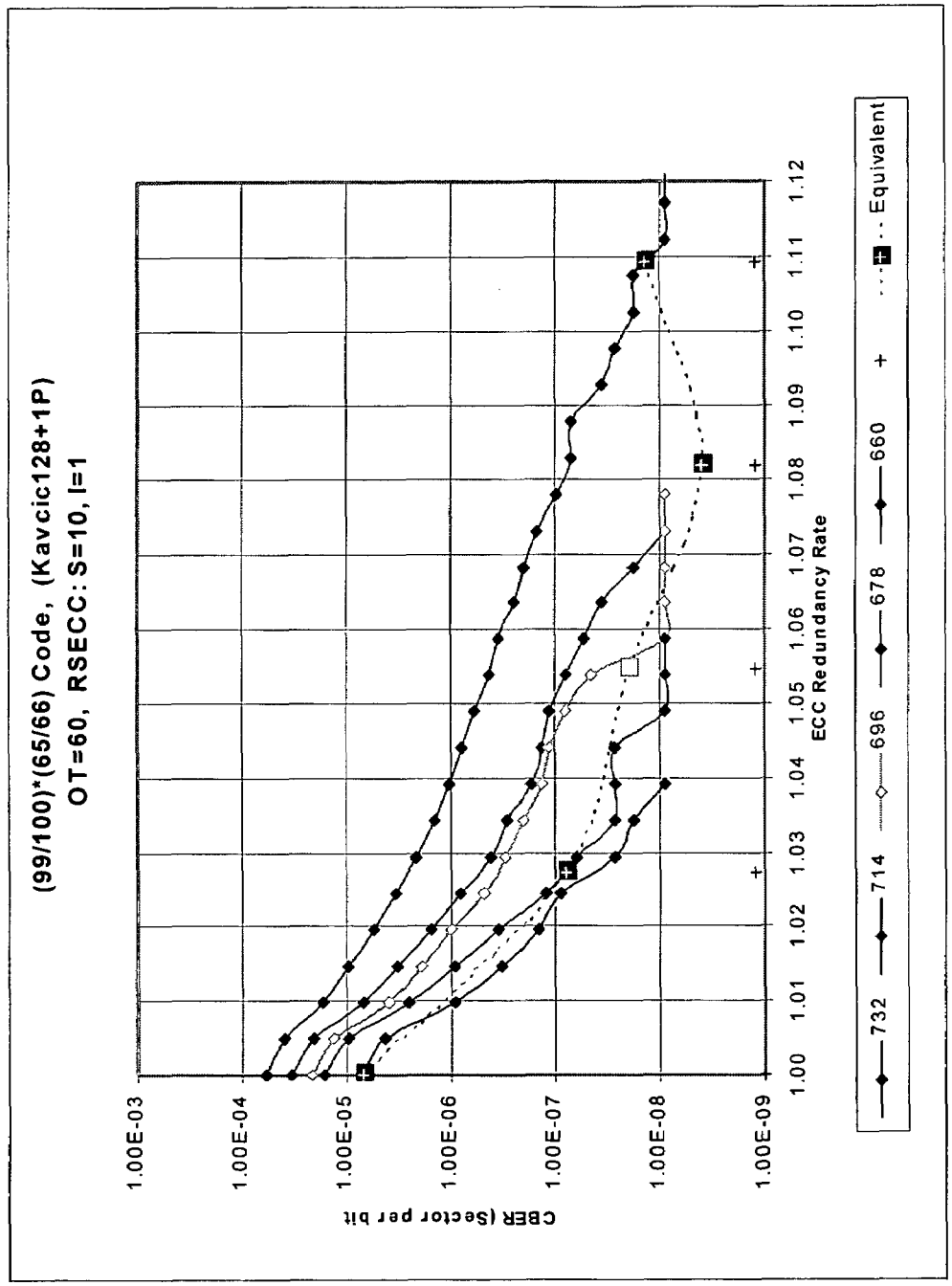

FIG. 7-1 is a more detailed illustration of a sector 700 (such as one of sectors 630-639 illustrated in FIG. 6). In accordance with one aspect of the present invention, sector 700 includes a number of portions, including a portion 702 containing attributes, and a number of data portions 704, 706, and 708, each with an associated error correction code portion 710, 712 and 714, respectively. While the error correction code portions 710, 712 and 714 are shown adjacent the corresponding data portions, they need not be recorded this way on the disc, but are shown this way for expedience. Thus, in accordance with one embodiment, each of the data portions (and indeed possibly the attributes portion) of sector 700 is used to generate error correction code (ECC) information in a known manner. This information can be used, when reading back the corresponding user data 704, to determine whether the user data contains any errors, and (depending on the code used) to locate and correct those errors. In one preferred embodiment, the ECC information is generated using a Reed Solomon code. However, any suitable code can be used to generate the ECC information. Current drives use a Reed Solomon code with an estimated I=1 T=18 and S=10 where I is the interleave, S is the symbol length in bits and T is the correction level. This requires 2*T*S bits of data for a 512 byte sector and is currently considered optimal. This is illustrated in FIG. 7-2, which illustrates the relationship between the bit error rate and the ECC redundancy rate. This is a redundancy of 360 bits or 45 bytes and protects about 22 bytes without erasures. Additional redundancy cannot generally be added to a sector.

Figure 8:
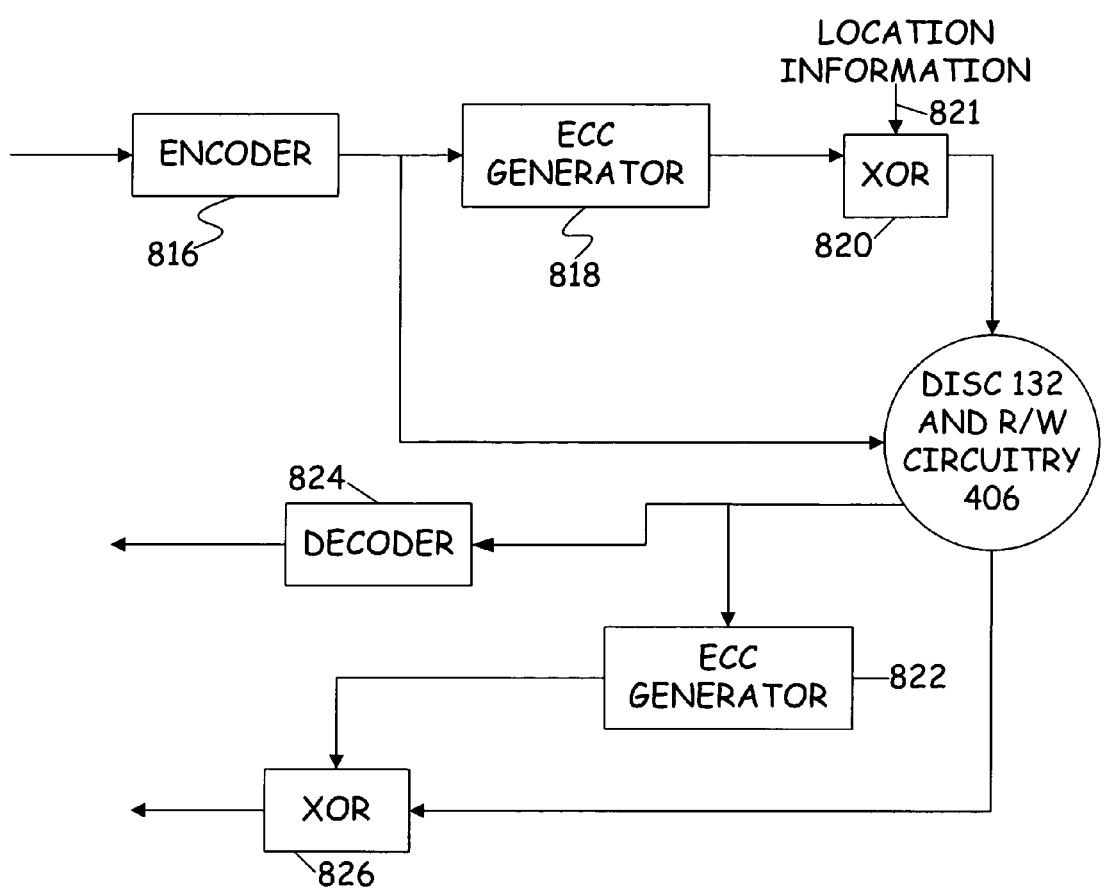
FIG. 8 is a block diagram illustrating how data is combined with ECC.

FIG. 8 is a block diagram illustrating one example of how file system information is combined with, or embedded in, ECC information prior to recording the information on the disc. FIG. 8 also illustrates how the file system information is used to reconstruct the data in accordance with embodiment of the present invention. FIG. 8 shows encoder 816, ECC generator 818, Exclusive OR circuit 820, disc 132 and read/write circuitry 406, ECC generator 822, decoder 824 and Exclusive OR circuit 826. It should be noted that encoder 816, ECC generator 818, Exclusive OR circuit 820, decoder 824, ECC generator 822 and Exclusive OR circuit 826 can all be implemented within control component 150 on the disc drive, or can be implemented separately.

User data is first provided to encoder 816 from a host, a requester or a file server. Encoder 816 encodes the data according to a predetermined coding algorithm, typically implemented to decrease error rate. The encoded user data is then provided to ECC generator 818. ECC generator 818 generates ECC information based on the encoded user data, in a known manner. The ECC information generated will depend on the particular type of error correction coding scheme used. The ECC information is, in turn, provided to Exclusive OR circuit 820. The file system data is also provided to Exclusive OR circuit 820 at input 821. In the embodiment illustrated in FIG. 8, the data is location information which identifies a location of a sector or sectors at which the user data is written on disc 132. For example, the location information includes the sector identifier which identifies the sector to which the user data belongs. The location information also includes relative position information which identifies the relative position of the associated data portion within the identified sector. The output of Exclusive OR circuit 820 thus provides the ECC information with the located information embedded (or seeded) therein. This information is provided to read/write circuitry 406 and is written to disc 132, as the associated ECC portion for the data portion containing the encoded user data provided by encoder 816.

When reading the information back from disc 132 (in order to accomplish a normal read operation) the control component 150 executes a Read function by providing the expected location information to an Exclusive OR circuit, and Exclusive ORing that information with the ECC information (which contains the embedded location information). The output of the Exclusive OR circuit yields the ECC information associated with the user data being read. This information is provided to an ECC generator 822, which determines whether any errors have occurred in the encoded user data. If not, the encoded user data is provided to a decoder 824 where the error free information is presented to the requester or user. If errors have occurred, control component 150 may attempt to identify and correct the errors, depending upon the particular error coding scheme used. Alternatively, control component 150 may simply provide an error flag indicating that the data contains one or more uncorrectable errors.

Control component 150 is also configured to provide additional error correction capacity to the disc drive, depending on the amount of free space on disc 132. Control component 150 is configured to determine the remaining capacity of the disc 132. Based on the remaining capacity of the disc 132, control component 150 selects from one of the following redundancy or error correction schemes: 1) mirroring, 2) compressing data and adding additional ECC, 3) compressing mirrored data, 4) adding additional ECC, 5) or any combination of the above. A more complete description of the process in determining the which method to employ is described below with reference to FIGS. 9-11.

Figure 9:
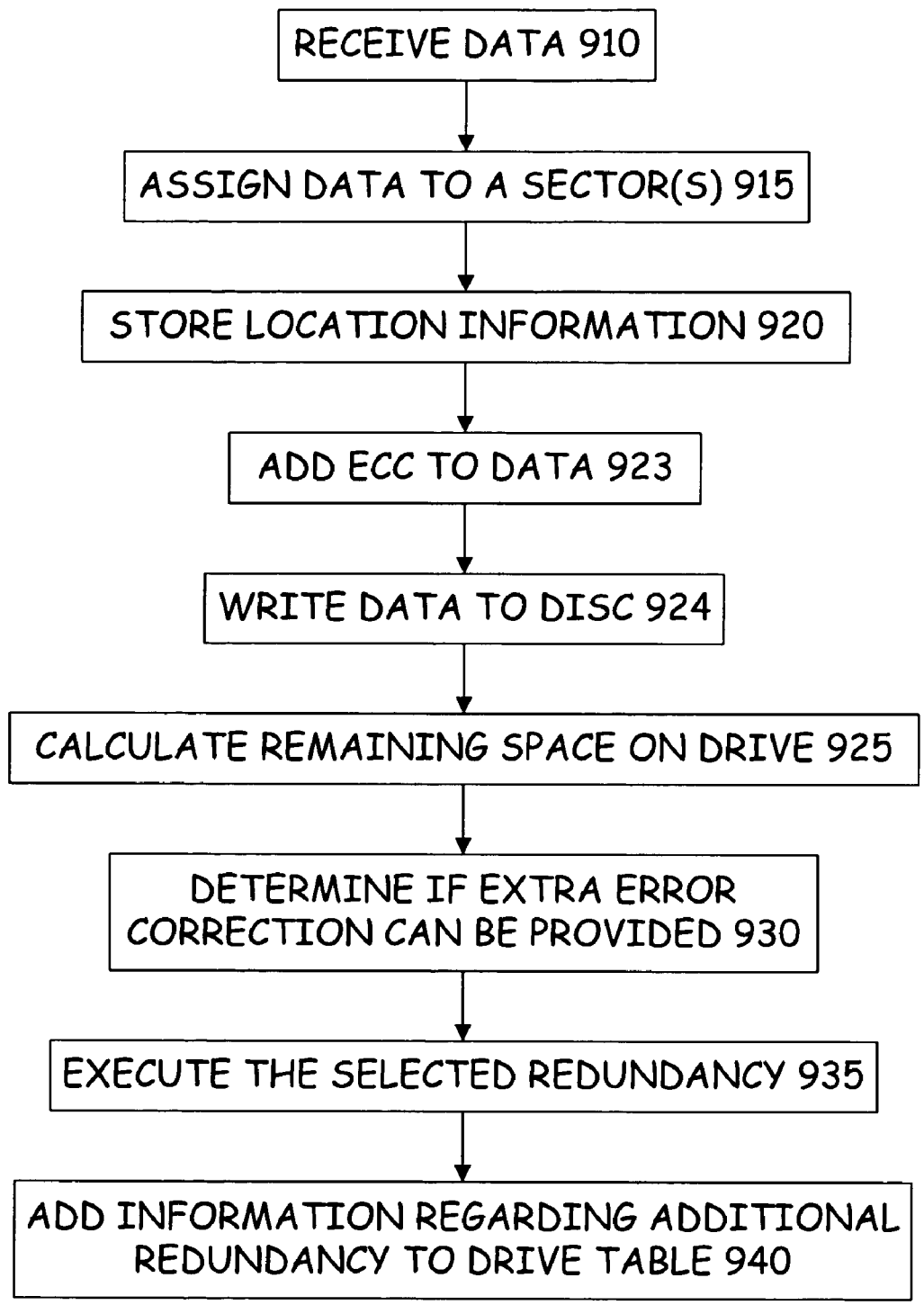
FIG. 9 is a flow chart in accordance with an embodiment of the present invention

FIG. 9 is a flow diagram illustrating the steps executed by the drive 110 and control component 150 when new data is written to the disc 132. Data is received from a host computer at step 910. The control component 150 then assigns the data to a sector or multiple sectors, depending on the size of the data to be written at step 915. Depending on the specific firmware for the drive, the location of data is stored to drive table. However, other methods can be used to store the data location. This is illustrated at block 920. At block 923 error correction code is added to the data, and the data is stored on disc 132 at block 924.

Following the writing of the data to the disc, including any normal error correction code, the control component calculates the remaining free space on drive 110 at step 925. The remaining free space on the drive and the nature of the data stored on the drive are used to determine if any other redundancy or error correction is provided. A complete description of the analysis performed at step 930 is illustrated in FIG. 10 below.

After determining if there are additional redundancies that can be added to the disc, the drive, through the control component 150, executes the selected redundancy. This is illustrated at step 935. A notation of the added redundancy is made in the drive table for the stored data. This is illustrated 940. If multiple redundancies are used, then multiple entries are made in the drive table at step 940.

Figure 10:
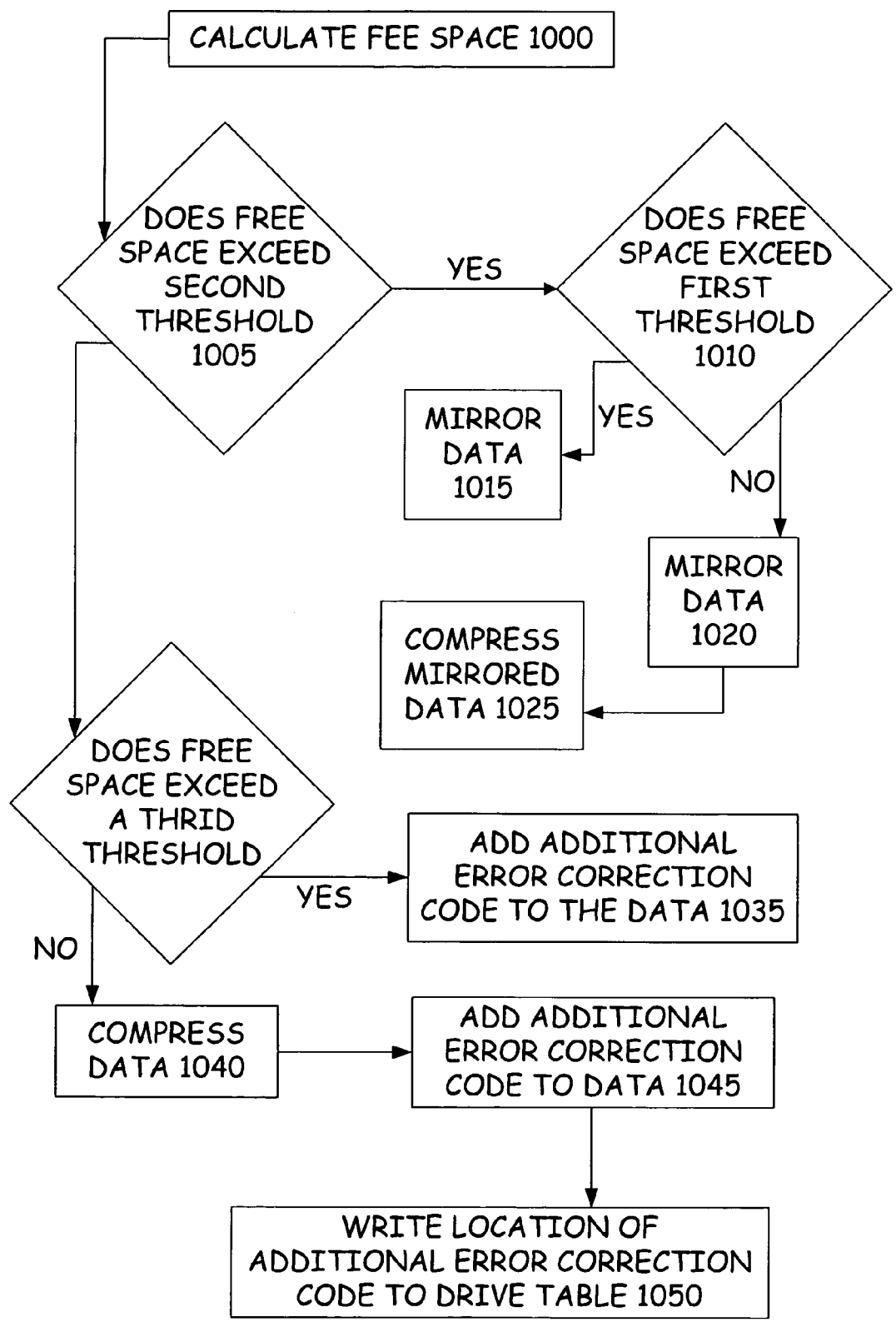
FIG. 10 is another flow chart in accordance with an embodiment of the present invention
Figure 11:
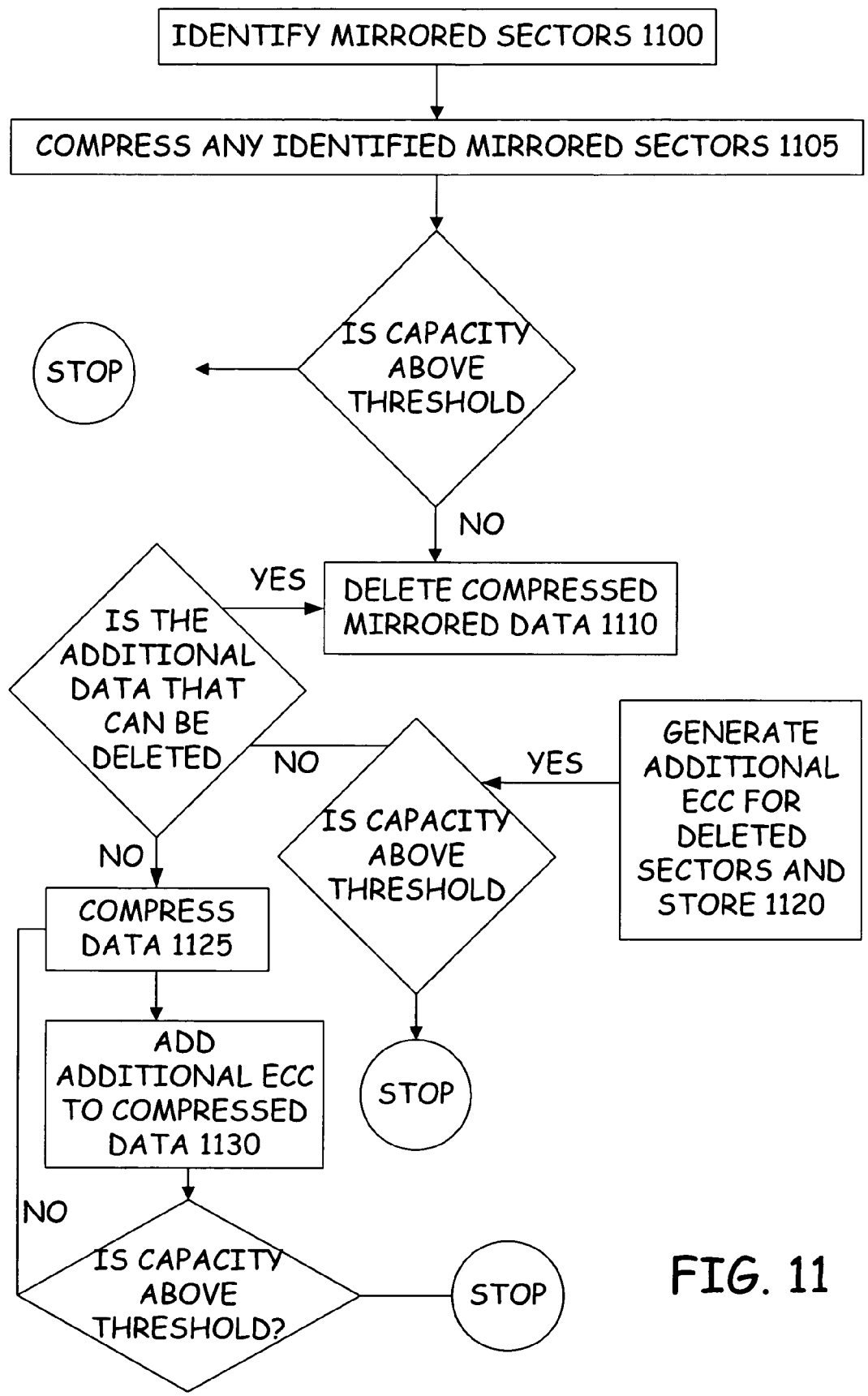
FIG. 11 is yet another flow chart in accordance with an embodiment of the present invention

FIG. 10 is a flow diagram illustrating the process executed by the control component 150 in determining the additional error correcting capability according to one embodiment of the present invention. While FIG. 10 illustrates one method of determining error correction methods for the drive, those skilled in the art will realize that other threshold values can be used. Further, the various techniques can be combined with each other depending on the needs of the system.

First the available space on the drive is calculated at step 1000. Then the system checks to see if the available space exceeds a second threshold. In one embodiment the second threshold is 50%. 50% of the drives overall capacity. This is illustrated at step 1005. If the unused space on the drive is greater than second threshold then the system can proceed with options that include mirroring the data. Next the control component 150 determines is the available space of the drive exceeds a first threshold. In one embodiment this first threshold is 70% of the overall capacity of the drive. This is illustrated at step 1010. While 70% is illustrated in as the first threshold those skilled in the art will recognize that depending on the drive design and specification other values can be used for the first threshold. If the available space exceeds the first threshold the control component 150 will mirror, i.e. copy the data including any ECC, from one sector to another unused sector on the disc 132. This is illustrated at step 1015. In one embodiment the mirrored sector is located next to the original sector. However, to increase the likelihood of data recovery if the sector goes bad, the mirrored sector is preferably located in a different area of the disc 132.

If the available free space on the drive is between first and second threshold the control component 150 mirrors the data in the sector on another sector on the disc. This is illustrated at step 1020. However, to preserve space on the drive, as well as to minimize the amount of rewriting or reconfiguring of the drive when additional data is written to the disc these mirrored sectors are compressed using a known compression routine configured in the control component. This compression step is illustrated at block 1025.

If the available free space on the drive is less than the second threshold the control component 150 considers or processes the new data differently than it does if the second threshold is exceeded. First the control component 150 determines if the drive's remaining capacity exceeds a third threshold. In one embodiment the third threshold is 25% of the capacity of the drive. This is illustrated at step 1030. If the drive's remaining capacity exceeds the third threshold the control component 150 adds additional error correction code to the data. This is illustrated at step 1035. This additional error correction code for the data can be stored in the same sector as the data, or it can be stored in unused sectors of the disc 132. If the additional ECC is stored in another sector a notation is provided in the drive table informing the control component 150 where the additional ECC is stored.

If the available free space on the disc is less than the third threshold, the control component 150 compresses the data. This is illustrated at step 1040. Following compression of the data, using a known data compression protocol such as zip, additional space is freed in the sector, as illustrated in FIG. 7-3. The compression of the data is illustrated by element 790 in FIG. 7-3. Data 790 is a compressed version of data 704 shown in phantom in FIG. 7-3. This additional space 792 is the space used for additional ECC.

This compression of the data is done in the background, and is invisible to the user. In the free space of the sector generated by the data compression, the control component 150 generates additional ECC for the data. This additional ECC is added to the sector in the free space generated by the data compression. This illustrated at block 1045. If the data to be compressed is already compressed such as when the data is in zip format, or is not compressible, such as random data, then the control component 150 stores the additional ECC in another sector of the disc. The controller also writes the location of the additional ECC to the drive table. This is illustrated at block 1050.

Therefore, through the process illustrated in FIGS. 9-10 the ability to recover lost data is increased. This is achieved by leveraging the free space on the disc to store either a copy of the data or additional ECC for the data. However, as more data is added to the disc the capacity of the disc to store the additional error correction is reduced. To combat this problem the control component 150 periodically checks the status of the drive, and determines the remaining capacity of the drive. If the control component 150 determines that the available free space is below a predetermined threshold value, the control component 150 reviews the redundant data currently stored on the disc. During this review the control component 150 can charge the way the redundant data is stored, or even erase this data, to generate more free space on the drive for user provided data to be stored. This process is illustrated by the flow chart of FIG. 11.

In one embodiment, if the control component 150 determines that the redundant data needs to be modified, the control component 150 first identifies those sectors containing mirrored data. This is illustrated at step 1100. The control component then proceeds to compress any identified redundant files using its compression routine. This is illustrated at step 1105. The control component continues to compress the mirrored data until either there is no more data to be compressed, or the drive free space is increased to the threshold level. If however, following compression of the redundant data, the free space on the drive has not fallen below the threshold, the control component starts to delete redundant data. This is illustrated at step 1110.

Once all of the mirrored data has been compressed, the control component 150 in one embodiment deletes redundant data based on when the parent file/data was last accessed. This is illustrated at step 1115. In this embodiment the data, which has not been accessed for the longest period of time is deleted first (least current). At this point the control component 150 generates additional FCC for the removed data to maintain the additional redundancy benefits. This is illustrated at step 1120. However, other methods can be used in determining which redundant data to delete.

If there is no remaining mirrored compressed data, as it has been deleted, the control component 150 proceeds through the visual data, and compresses the data to generate more free space. This is illustrated at step 1125. Like before the control component 150 compresses data that has not been recently accessed. The extra space freed is used for additional error correction codes. This is illustrated at step 1130. Once again other methods can be used to determine which data should be compressed. It should be noted that this process of manipulating the data occurs in the background without any intervention from the user. Thus, the entire process is transparent to the user. When compressed data is accessed, the control component decompresses the data in the drive's cache, and then provides the decompressed data to the user. Thus the user never knows the data was compressed.

If during the accessing of the data an error is discovered, the control component 150 identifies where the error correction for this data is located. The control component 150 then accesses the error correction and process any error correction code according to known methods. However, because the present invention stores more ECC for the data a larger data errors can be recovered.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the media storage device and system while maintaining substantially the same functionality without departing from the scope and spirit of the present invention. In addition, although the preferred embodiment described herein is directed to a disc drive having additional error correction capability, it will be appreciated by those skilled in the art that the teachings of the present invention can be applied to other storage medias, without departing from the scope and spirit of the present invention.

What is claimed is:

1. A data storage system comprising:
    a storage media for storing data;
    a controller configured to:
        determine an amount of available data storage space available on the storage media;
        compare the amount of available data storage space to a plurality of threshold values, wherein each of the plurality of thresholds corresponds to an amount of available data storage space on the storage media and a method of error correction;
        identify a first threshold value of the plurality of threshold values that corresponds to the determined amount of available data storage space;
        select a method of generating additional error correction information from a plurality of methods of generating additional error correction information for data stored on the storage media based upon the first threshold value;
        generate additional error correction information based upon the selected method; and
        store the additional error correction information.

2. The data storage system of claim 1 wherein the controller is configured to store a mirror copy of the data on the available data storage space of the storage media when the amount of available data storage space is greater than or equal to the first threshold value.

3. The data storage system of claim 2 wherein the controller is configured to store the mirror copy of the data as a compressed version of the data.

4. The data storage system of claim 2 wherein the controller is configured to select a Reed/Solomon code for the method of generating additional error correction information when the amount of available data storage space is less than the first threshold value.

5. The data storage system of claim 1 wherein the storage media comprises at least one disc divided into a plurality of sectors, and the controller stores the data on at least one of the plurality of sectors.

6. The data storage system of claim 5 wherein the controller is further configured to determine an unused amount of each of the plurality of sectors on the at least one disc, and to select the method of generating additional error correction information from the plurality of methods for generating additional error correction information based on the unused amount of each sector.

7. The data storage system of claim 6 wherein the controller is further configured to compress the data in a sector, generate additional error correction information for the data in the sector, and store the additional error correction information in a space available due to the compression of the data.

8. The data storage system of claim 6 wherein the controller is configured to write a location of the error correction information for each of the sectors to a redundancy table.

9. The data storage system of claim 6 wherein the controller is configured to generate a compressed version of the data to be stored in another sector of the storage media, generate a Reed/Solomon error correction code for the data, and store the Reed/Solomon error correction code in the unused portion of the sector.

10. The data storage system of claim 1 wherein a first method of the plurality of methods of generating additional error correction information comprises creating a mirror copy of data on the storage medium and a second method of the plurality of methods of generating additional error correction information comprises compressing data on the data storage medium.

11. The data storage system of claim 10 wherein a third method of the plurality of methods of generating error correction information comprises generating additional error correction code for data stored on the data storage medium.

12. The data storage system of claim 11 wherein a fourth method of the plurality of methods of generating error correction information comprises compressing a mirrored copy of data stored on the data storage medium.

13. The data storage system of claim 1 wherein the data and the additional error correction information are both stored within a single disc drive.

14. A method of storing data on a storage media comprising the steps of:
receiving data at a storage device containing the storage media;
adding error correction information to the received data;
calculating an amount of available data storage space on the storage media;
comparing the amount of available data storage space against a plurality of threshold values, wherein each of the plurality of thresholds corresponds to an amount of available data storage space on the storage media and a method of error correction;
identifying a first threshold value of the plurality of threshold values that corresponds to the calculated amount of available data storage space;
selecting a method of error correction from a plurality of methods of error correction based on the first threshold value;
generating additional error correction information based upon the selected method of error correction;
storing the data on the storage media; and
storing the additional error correction information on the storage media.

15. The method of claim 14 further comprising:
when the calculated amount of available data storage space is greater than the first threshold value:
creating a mirror copy of the received data;
storing the mirror copy of the received data on a different location of the storage media; and
adding error correction information to the mirror copy of the received data.

16. The method of claim 15 further comprising:
when the calculated amount of available data storage space is less than or equal to the first threshold value and greater than a second threshold value of media capacity:
compressing a copy of the received data to create a compressed copy of the received data; and
storing the compressed copy on a different location of the storage media.

17. The method of claim 16 further comprising adding error correction information to the compressed copy of the data.

18. The method of claim 16 further comprising:
when the calculated amount of available data storage space is less than or equal to the second threshold value of media capacity:
generating additional error correction information for the received data; and
storing the additional error correction information in a different location on the storage media.

19. The method of claim 18 further comprising;
when the calculated amount of available data storage space is less than or equal to a third threshold value of media capacity:
compressing a portion of the data on the media to increase the amount of available data storage space on the storage media;
generating additional error correction information for the received data; and
storing the additional error correction information on the storage media.

20. The method of claim 19 further comprising:
when the calculated amount of available data storage space is less than a fourth threshold value of media capacity:
identifying a mirrored copy of data on the storage media; and
compressing the identified mirrored copy of data.

21. The method of claim 20 further comprising:
when no mirrored copies of data are identified:
identifying a compressed mirrored copy of data on the storage media;
deleting the identified compressed mirrored copy and deleting at least one more identified compressed mirrored copy when the available data storage space is less than the fourth threshold value.

22. The method of claim 21 further comprising deleting at least one compressed copy based on a frequency of access of data associated with compressed copy.

23. The method of claim 21 further comprising generating additional error correction information for the data associated with the deleted compressed mirrored copy.

24. The method of claim 21 further comprising:
when no compressed mirrored copies are identified:
compressing a portion of data stored on the media; and
generating additional error correction information for the compressed data.

25. The method of claim 24 further comprising compressing the portion of data based on a frequency of access of the portion of data.

* * * * *